(12) United States Patent  (10) Patent No.: US 7,783,976 B2
Endo et al.  (45) Date of Patent: Aug. 24, 2010

(54) METHOD AND APPARATUS FOR COMPARING DOCUMENTS, AND COMPUTER PRODUCT

(75) Inventors: Susumu Endo, Kawasaki (JP); Takayuki Baba, Kawasaki (JP); Shuichi Shiitani, Kawasaki (JP); Yusuke Uehara, Kawasaki (JP); Shigemi Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1034 days.

(21) Appl. No.: 11/340,742

(22) Filed: Jan. 27, 2006

(65) Prior Publication Data

US 2007/0094615 A1   Apr. 26, 2007

(30) Foreign Application Priority Data

Oct. 24, 2005   (JP)   ............................. 2005-308721

(51) Int. Cl.
*G06F 17/27*   (2006.01)
(52) U.S. Cl. ..................................................... 715/273
(58) Field of Classification Search ................. 715/838, 715/273
See application file for complete search history.

(56) References Cited

U.S. PATENT DOCUMENTS 6,542,635 B1 * 4/2003 Hu et al. ..................... 382/173

6,658,626 B1 * 12/2003 Aiken .......................... 715/205
2006/0080311 A1 * 4/2006 Potok et al. .................... 707/5

FOREIGN PATENT DOCUMENTS

JP   2000-148793   5/2000
JP   2005-140135   5/2005

OTHER PUBLICATIONS

Susumu Endo et al., "Digital Document sharing system—Application of MIRACLES to digital document retrieval and its evaluation", Study Report of Information Processing Society of Japan, 2004, (6PP).

* cited by examiner

*Primary Examiner*—Doug Hutton
*Assistant Examiner*—Tionna Smith
(74) *Attorney, Agent, or Firm*—Fujitsu Patent Center

(57) ABSTRACT

Thumbnails of pages of a key document are arranged sequentially according to a page order in a row. Thumbnails of pages of a target document are arranged sequentially according to a page order in a row parallel to the row of the key document. A key page of the key document is compared with each page of the target document. When a page of the target document that is most similar to the key page is found, the row of the target document is shifted in a horizontal direction so that the page of the target document that is most similar to the key page is positioned next to the key page.

17 Claims, 8 Drawing Sheets

METHOD AND APPARATUS FOR COMPARING DOCUMENTS, AND COMPUTER PRODUCT

BACKGROUND OF THE INVENTION

1. Field of the Invention

The present invention relates to a technology for comparing electronic documents to find a relevant document from among similar documents.

2. Description of the Related Art

One of the advantages of electronic documents is that a new electronic document can be created by using a part of an existing electronic document. With an effective use of the existing document in creating a new document, not only efficiency in creating a document but also a quality of the new document can be increased if the existing document is of a good quality.

Therefore, it is important to select an appropriate document for a base of the new document. Today, a large number of electronic documents are created, and there are abundant source documents to be recycled in a new document. However, this makes it rather difficult to select an appropriate document.

A desired document is often searched by specifying a keyword, and by searching based on the keyword from innumerable electronic documents. Other technologies that aid for searching a document are disclosed. In the technologies, a document is searched based on multimedia content in the document (for example, Japanese Patent Laid-Open Publication No. 2000-148793) or based on a document layout (for example, Japanese Patent Application No. 2005-140135).

However, even with the above conventional technologies, it is still necessary to open all of documents obtained as a result of the search and to check the contents of the documents, to find an optimal document to be used for a base of a new document. Such a work requires a lot of time and labor. Moreover, it is difficult to find difference in the contents of the documents when the documents have created based on an identical document.

SUMMARY OF THE INVENTION

It is an object of the present invention to at least solve the problems in the conventional technology.

A computer-readable recording medium according to one aspect of the present invention stores therein a computer program for comparing documents. The computer program making a computer execute comparing a document with a key document page by page, to determine a degree of similarity between the document and the key document; arranging the key document by arranging thumbnails of pages of the key document according to a page order; arranging the document by arranging thumbnails of pages of the document based on the degree of similarity of each of the pages of the document; and outputting a result of arrangement of the key document and the document.

An apparatus according to another aspect of the present invention is for comparing documents. The apparatus includes a comparing unit configured to compare a document with a key document page by page, to determine a degree of similarity between the document and the key document; a key-document arranging unit configured to arrange the key document by arranging thumbnails of pages of the key document according to a page order; a document arranging unit configured to arrange the document by arranging thumbnails of pages of the document based on the degree of similarity of each of the pages of the document; and an output unit configured to output a result of arrangement of the key document and the document.

A method according to still another aspect of the present invention is for comparing documents. The method includes comparing a document with a key document page by page, to determine a degree of similarity between the document and the key document; arranging the key document by arranging thumbnails of pages of the key document according to a page order; arranging the document by arranging thumbnails of pages of the document based on the degree of similarity of each of the pages of the document; and outputting a result of arrangement of the key document and the document.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention are explained in detail below with reference to the accompanying drawings.

In a document comparison method according to embodiments of the present invention, the document that is used as a base for comparison is specified as a key document, and a page that is used as a base for comparison are specified as the key page.

Suppose that a user has obtained a plurality of documents as a result of a search for potential base documents for creating a new document, and opens one of the documents from the search list and decides the document can be used as the base for the new document. There is always a possibility that a more appropriate document may be present among the remaining unopened documents, but there is no way of finding it unless the user opens all the documents to verify their contents.

In this situation, the user can use document comparison method as follows. The user specifies the base document that can be used as the base for the new document as the key document, one of pages of the base document that can be used again in the new document as the key page, and the other documents from the search result as target documents. Thus, the user can grade the documents on their similarity with the key document, compare the documents, and select the appropriate document.

Figure 1:
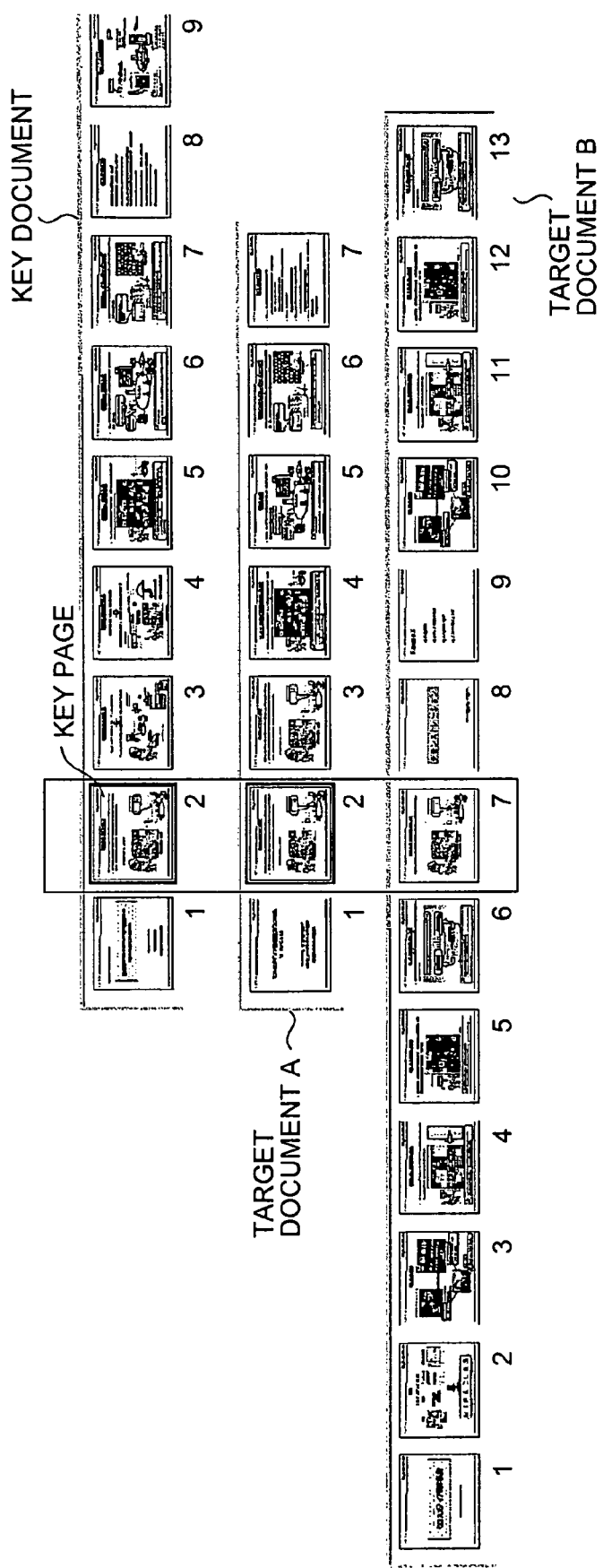
FIG. 1 is a schematic for illustrating an output result in a document comparison according to an embodiment of the present invention.

FIG. 1 is a schematic for illustrating an output result of the document comparison method. As shown in FIG. 1, in the document comparison method, all the pages of the documents being compared are displayed in a form of thumbnail. Thumbnails of one document is displayed in one row. The user can easily visually compare the thumbnails without having to open the documents.

As shown in FIG. 1, thumbnails of all the pages of the key document are sequentially arranged according to a page order. The thumbnails of all the pages of target document A are arranged sequentially according to a page order in a row below. Similarly, the thumbnails of all the pages of target document B are sequentially arranged in a page order below the row of target document A.

In the document comparison method, the key page of the key document is compared with each page of the target documents, and the target documents are shifted horizontally so that the page that is most similar to the key page in each of the target documents is positioned next to the key page. Thus, by arranging the key page and the pages similar to the key page in the target documents next to each other, comparison of the similar portions of the documents can be easily done.

For example, when a new document is created by appending a portion of another document to the end of an existing document, one may not notice the appended portion when comparing the documents. In this case, the target document is shifted horizontally such that similar portions appear next to each other.

In the example shown in FIG. 1, the second page of the key document is the key page. The second page of target document A is positioned next to the key page. As the seventh page of target document most resembles the key page, the seventh page of the target document is positioned next to the key page.

As a result of arranging similar pages next to each other, it can be easily discerned that pages 2 through 8 of the key document and pages 2 through 7 of target document A are similar and that the key document and target document B are not similar. By comparing the key document, which is one of the documents based on which the new document is to be created, and target document A, which is similar in content to the key document, a document that is even more appropriate to be the base document for the new document can be easily selected.

In the present invention, no particular order is specified for arranging the target documents. However, the document most similar to the key document may be closest to the key document. Comparison of documents can be made more easily if the target documents that most resemble the key document are closer to the key document.

The target documents may also be arranged according to last modified date. Alternatively, the target documents may be arranged one behind another by different criteria.

Further, a threshold value may be set for the degree of similarity of the pages, and those documents that fall short of the designated threshold value may not be displayed. Thus, when scores of target documents are involved, checking the comparison result becomes easier.

Figure 2:
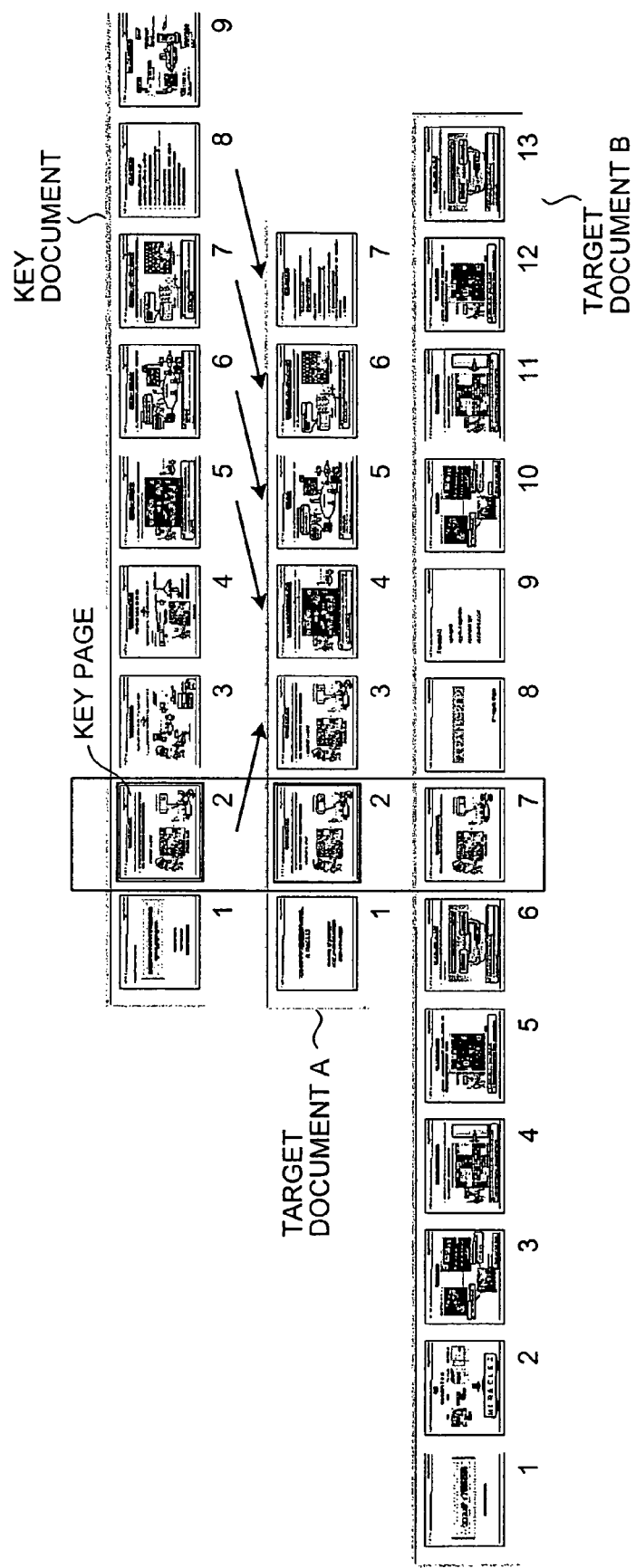
FIG. 2 is a schematic for illustrating an output result in the electronic document comparison according to an embodiment.

Further, instead of comparing each page of the target document with only the key page for similarity, each page of the target document may be compared with each page of the key document, and the comparison result may be displayed. FIG. 2 is a schematic for illustrating the output result of the document comparison method. As shown in FIG. 2, the set of pages having a degree of similarity greater than the designated threshold value may be joined by a line. Alternatively, the set of pages having a degree of similarity greater than the designated threshold value may be enclosed in a frame of one color, distinguishing them from the other pages. Thus, the degree of similarity between the documents can be easily discerned.

Further, the key page may not be specified. In this case, each page of the target document is compared for similarity with each page of the key document. The row of thumbnails of the target document is shifted such that the thumbnail of the target document that most resembles a page of the key document is positioned next to the page of the key document.

Figure 3:
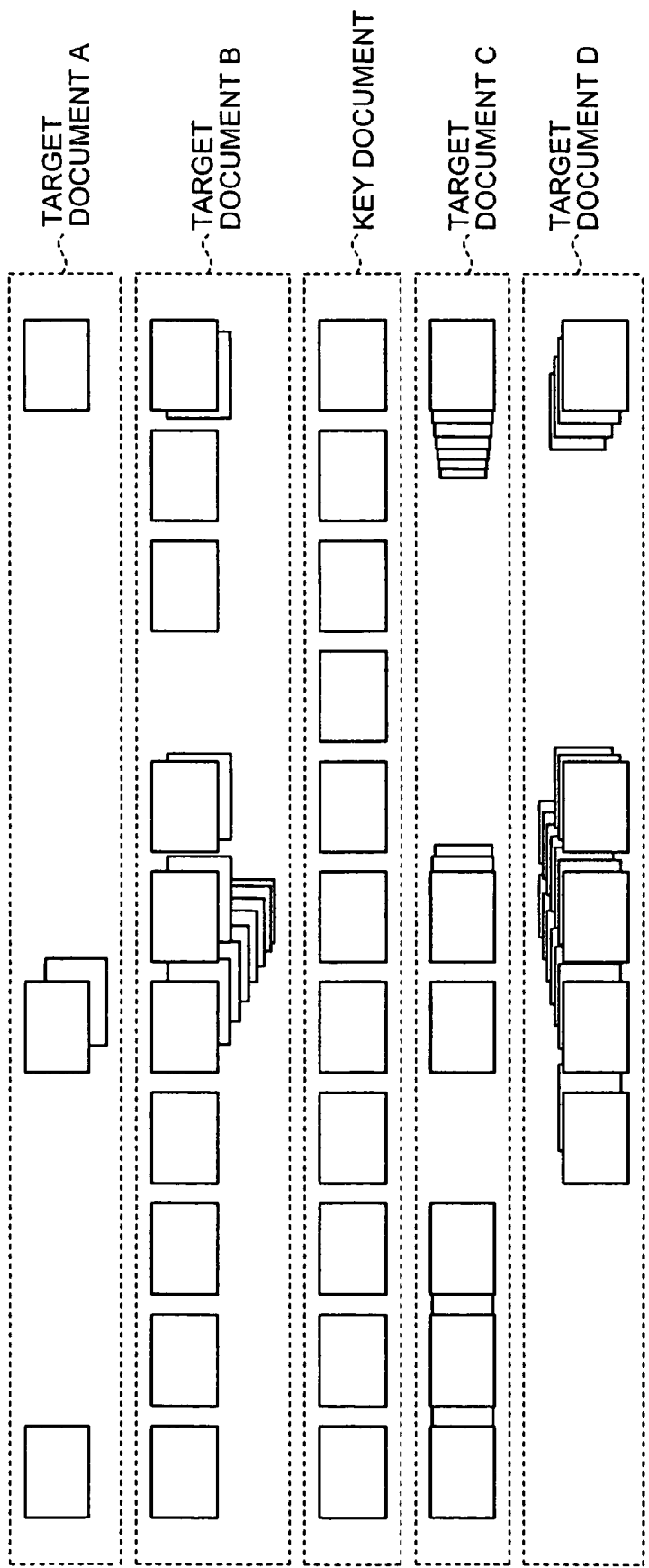
FIG. 3 is a schematic for illustrating an output result in the electronic document comparison according to an embodiment.

FIG. 3 is a schematic for illustrating the output result when no key page is specified. As shown in FIG. 3, the thumbnails of the key document are arranged sequentially in a single row.

However, though the thumbnails of the target documents are arranged in separate rows parallel to the row corresponding to the key document, within each row the thumbnails are arranged not sequentially but in such a way that the thumbnails of pages that are similar to the pages in the key document are positioned next to the thumbnails of those pages of the key document. Therefore, the rows corresponding to the target documents may include vacant spaces as well as portions where a plurality of thumbnails is stacked together.

Thus, the similarity of the overall document with the key document can be discerned, page order being not relevant in this case. For example, in FIG. 3, most of the pages of target document B are similar to those of the key document, which makes document B as a whole more or less similar to the key document. On the contrary, only some of the pages of Document C are similar to those of the key document, which makes document C as a whole not similar to the key document.

By comparing the key document, which is one of the documents based on which the new document is to be created, and target document B, which is similar in content to the key document, the user can easily select a document that is even more appropriate to be the base document for the new document.

In the present invention, the order in which the rows of the target documents are arranged is not specified. However, an average value for the degree of similarity between the adjacent pages of two rows may be calculated. The row of thumbnails of the target document having a highest average value may be arranged closest to the row of thumbnails of the key document. Thus, the target document that most resembles the key document is positioned next to the key document, making it easier to compare the documents.

The target documents may also be arranged according to last modified date. Alternatively, the target documents may be arranged one behind another by different criteria.

Further, a threshold value may be set for the average value of degree of similarity of the pages, and those documents that fall short of the designated threshold value may not be displayed. Thus, when scores of target documents are involved, checking the comparison result becomes easier.

Further, a threshold value may be set for the degree of similarity of the pages, and those pages of the target documents that fall short of the designated threshold value may not be displayed. Thus, it can be ensured that pages having a degree of similarity equal to or exceeding the designated value are displayed, making comparing the similarity between the documents easier.

Figure 4:
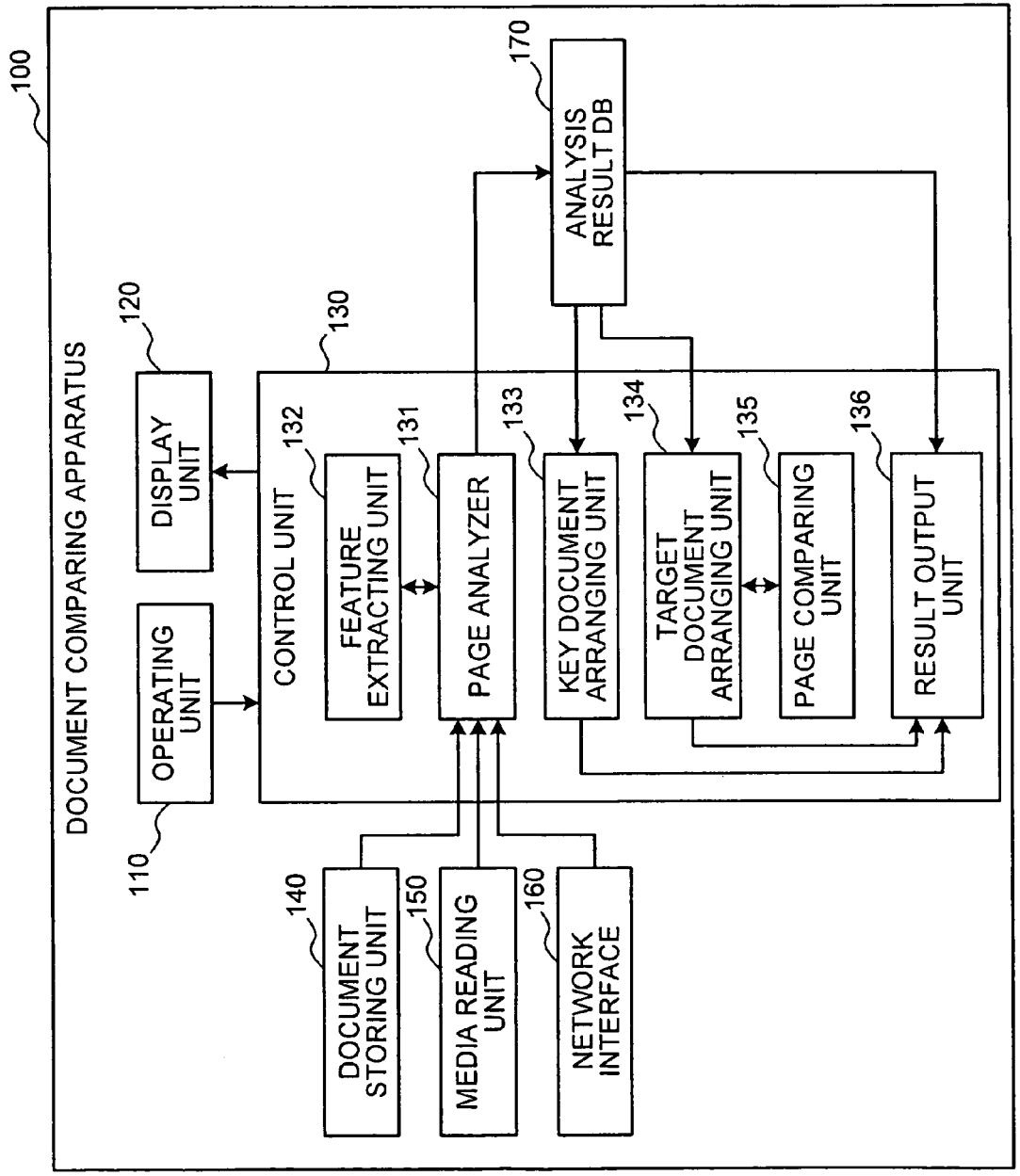
FIG. 4 is a block diagram of a document comparing apparatus according to an embodiment of the present invention.

FIG. 4 is a block diagram of a document comparing apparatus according to an embodiment of the present invention. As shown in FIG. 4, a document comparing apparatus 100 includes an operating unit 110, a display unit 120, a control unit 130, a document storing unit 140, a media reading unit 150, a network interface 160, and an analysis result DB 170.

The operating unit 110 accepts user operation and may for instance consist of a keyboard and a mouse. The display unit 120 displays process result, and the like, and may consist of a liquid crystal display. The control unit 130 controls the entire document comparing apparatus 100, and consists of a page analyzer 131, a feature extracting unit 132, a key document arranging unit 133, a target document arranging unit 134, a page comparing unit 135, and a result output unit 136.

The page analyzer 131 analyzes the key document and the target documents page by page, extracts the features, and stores the extracted features as feature data in the analysis result DB 170. The page analyzer 131 also creates the thumbnails of all the pages of both the key document and the target document and stores them in the analysis result DB 170 by associating each thumbnail with the corresponding feature data.

The key document and the target document are retrieved from the document storing unit 140, media reading unit 150, or network interface 160. The document storing unit 140 is a storage device having the capability of storing various types of documents, and may consist of a magnetic disk device, and the like. The media reading unit 150 reads storage media such as the Compact Disk-Read-Only Memory (CD-ROM) on which various documents are stored. The network interface 160 is a communication device that retrieves documents stored on other servers over the network.

The key document and the target document may also be specified by the user with the operating unit 110 or may be output from other programs or devices such as a document searching system.

The feature extracting unit 132 assesses specific pages of a document by representing the features of the page numerically. The page analyzer 131 invokes the feature extracting unit for analyzing a page. Various methods are employed for representing the features of a page numerically. The page analyzer 131 stores the various numeric values by associating them with the method used to obtain them.

One of the methods used for representing the features of the page numerically is by using an HSI color histogram. A color histogram is obtained by projecting the RGB value of each pixel of the image on an HSI color coordinate system and displaying the spatial distribution in the HSI color coordinate system as vectors. How the RGB values of the pixels are converted to HSI value is described next.

Suppose that the R, G, and B values range between 0 and 1, and the maximum R, G, and B value that is input is represented by "max", and the minimum R, G, and B value that is input is represented by "min", then.

If, I=(max+min)/2, and
1) If max=min, S=0 (H is indeterminate)
2) If I≦0.5, S=(max−min)/(max+min)
3) Under all other conditions, S=(max−min)/(2−max−min).
   Further, if Δ=max−min, and
1) If R is max, H=(G−B)/Δ*60
2) If G is max, H=(2+(B−R)/Δ)*60
3) If B is max, H=(2+(R−G)/Δ)*60,
and if H<0, H=H+360.

The feature extracting unit 132 outputs the values of H (0 to 360), S (0 to 1), and I (0 to 1). When taking H to be in the range 0 to 1, it may be divided by 360.

Further, the shape feature may also be represented numerically by wavelet conversion. In this method, the image is analyzed to determine the frequency at various points on the screen to check whether the change in the frequency is minute or significant.

The wavelet function Wf is represented in terms of the parameters frequency a and the position b is defined the by Equation 1 given below.

$$Wf(a, b) = 1/\sqrt{a} \int f(x) \Psi((x-b)/a) dx \quad (1)$$

where, $\Psi$ is the mother wavelet. This method can be used for analyzing 2D images as the input is digitized and applied once again.

Further, the method described in Japanese Patent Application No. 2005-140135 may be employed to represent the layout feature numerically.

Word occurrence frequency can be considered as the feature of the page. Word occurrence frequency is calculated by subjecting the text to morpheme analysis to obtain the various grammatical classes (such as, the noun, verb, particle, etc.), and calculating the occurrence frequency of a grammatical class, such as the noun. If the category of the document is known, the occurrence frequency of the already known word may be calculated.

The calculation of these numeric values may also be carried out before comparing the documents. By analyzing the pages of the target document beforehand and storing the analysis result in the analysis result DB 170, the calculation process of the feature extracting unit 132 during document comparison can be dispense with.

The key document arranging unit 133 arranges the thumbnails of all the pages of the key document sequentially in a single row.

The target document arranging unit 134 arranges the thumbnails of all the pages of the target document according to whether the key page has been specified.

If the key page has been specified, the target document arranging unit 134 retrieves from the analysis result DB 170 the feature data of the key page and the feature data of all the pages of the target document. By comparing the feature data of the pages of the target document with the feature data of the key page, the target document arranging unit 134 selects the page that most resembles the feature data of the key page.

The target document arranging unit 134 then converts the degree of similarity between the selected page and the key page into distance, and arranges the thumbnails of the target document sequentially in a single row at the calculated distance from and parallel to the row containing the thumbnails of the key document. The target document arranging unit 134 then shifts the row of the thumbnails of the target document horizontally so that the page that most resembles the key page is positioned next to the key page.

If the key page has not been specified, the target document arranging unit 134 retrieves the feature data of all the pages of the key document followed by the feature data of all the pages of the target document from the analysis result DB 170. When retrieving the feature data of the pages of the target document, the target document arranging unit 134 determines which page closely resembles which page of the key document and places the thumbnail of the page over the thumbnail of page of the key document it closely resembles. The target document arranging unit 134 also calculates the distance based on the degree of similarity between the two pages.

Once all the pages of the target document have been arranged in this manner, the target document arranging unit 134 determines the average value of the distances and shifts the row of the thumbnails of the target data vertically by this distance.

The page comparing unit 135 assesses the degree of similarity between the two pages based on the feature data and is invoked by the target document arranging unit 134 for comparing the similarity between pages. The degree of similarity between pages can be assessed based on data that has all been converted to numeric values. Alternatively, based on the type of documents or user specification, numeric values may only be partly used. A different weight may be assigned according to the numeric values.

The actual degree of similarity can be determined by considering the feature quantity as a vector and using Euclid distance value for calculating the distance of the vector. The distance values for the feature quantity of the key page and the feature quantities of each of the pages of the target document are calculated, and least distance value is considered as the maximum degree of similarity. Calculation of Euclid distance is described below.

If vector $v=(v_1, v_3, v_2 \ldots v_n)$ and vector $u=(u_1, u_3, u_2 \ldots u_n)$, then, Euclid distance $dist(v, u)$ can be expressed by the Equation 2.

$$dist(u, v) = \sqrt{(v_1 = u_1)^2 + (v_2 u_2)^2 + (v_3 u_3)^2 + \ldots + (v_n u_n)^2} \quad (2)$$

The square root may be dispensed with from the expression. A threshold value may be specified, and if the degree of similarity is less than the threshold value (in other words, if the distance value is greater than the threshold value), it may be taken to indicate that no page similar to the key page exists.

The result output unit 136 outputs the arrangement results of the key document arranging unit 133 and the target document arranging unit 134 on the display unit 120 or a not shown printer. When displaying the thumbnails in a stacked fashion, they may be displayed tiled in a pseudo-3D form, as shown in FIG. 3, rather than one completely behind another.

The page having the maximum degree of similarity may be topmost on the stack of the thumbnails of the target document. The entire display or a part of it may be enlarged or shrunk according to user specification.

Figure 5:
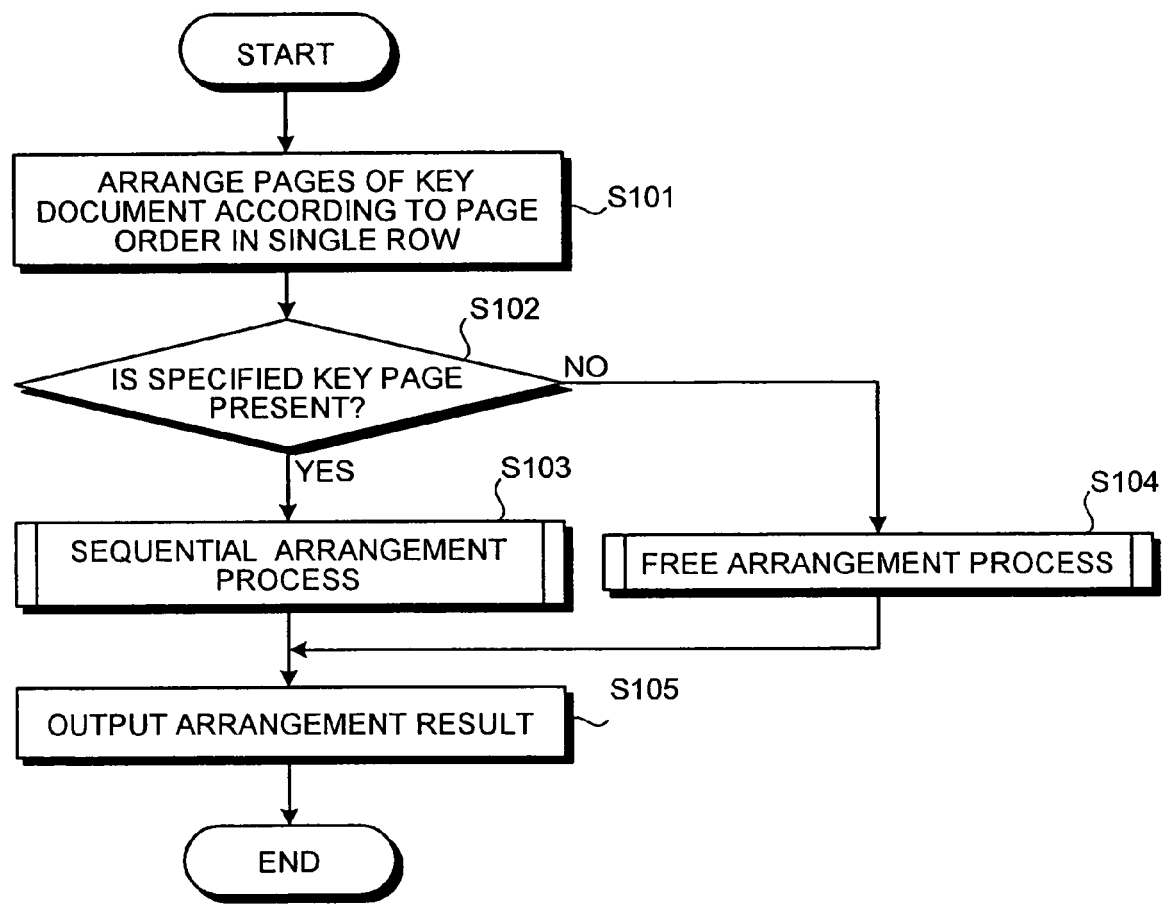
FIG. 5 is a flowchart of a process in the document comparing apparatus shown in FIG. 4.

The process flow of the document comparing apparatus 100 is explained next. FIG. 5 is a flowchart of a process in the document comparing apparatus 100 shown in FIG. 4. It is supposed here that all the pages of the key document and the target document specified by the user have been analyzed and their feature data have been stored in the analysis result DB 170.

As shown in FIG. 5, the key document arranging unit 133 arranges the thumbnails of the pages of the key document sequentially in a single row (step S101). If the key page has been specified ("YES" at step S102), the target document arranging unit 134 carries out a sequential arrangement process (step S103), explained later. If the key page has not been specified ("NO" at step S102), the target document arranging unit 134 carries out a free arrangement process (step S104), explained later. The result output unit 136 outputs the arrangement results (step S105), thus ending the process.

Figure 6:
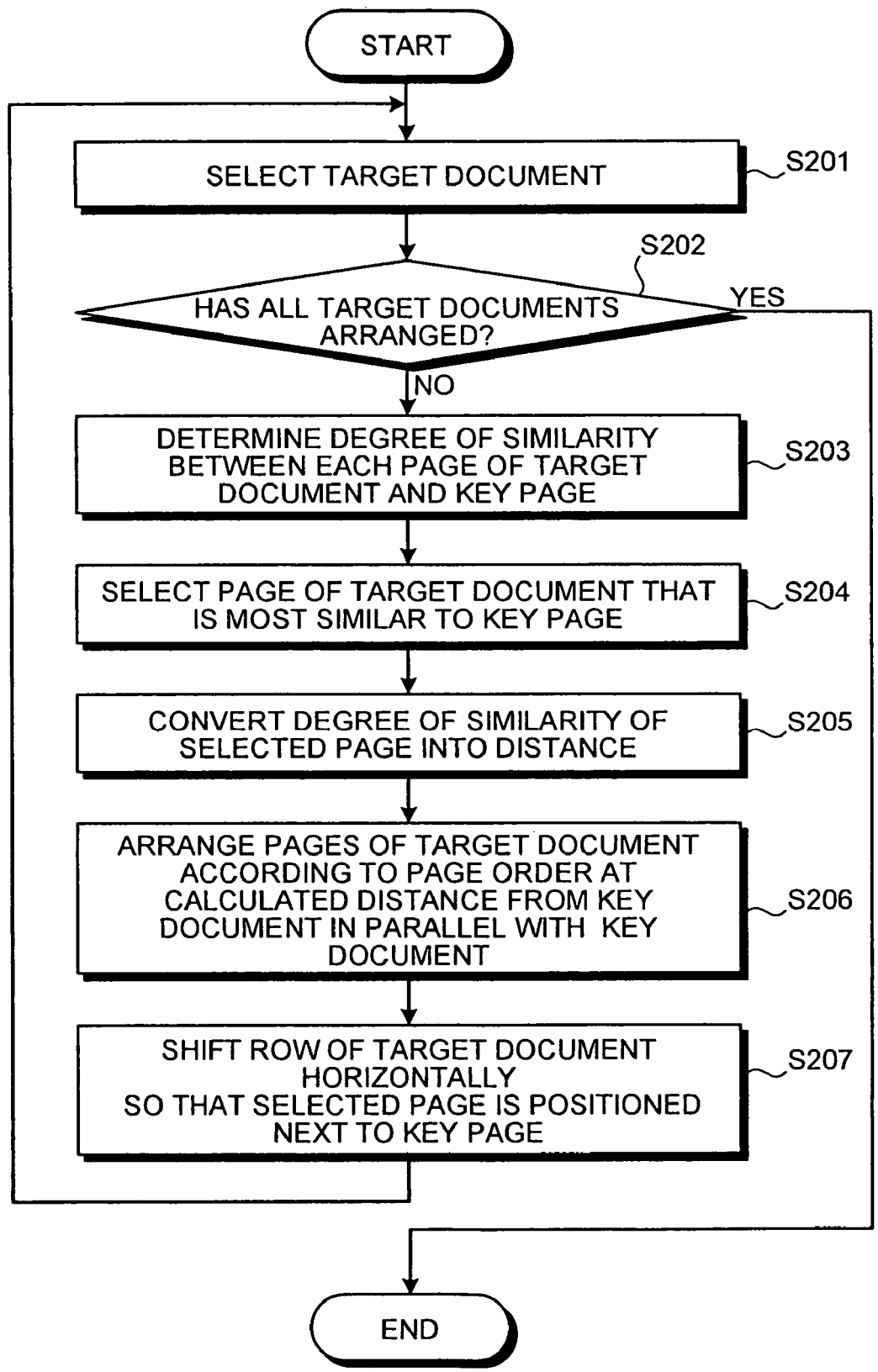
FIG. 6 is a flowchart of a sequential arrangement process shown in FIG. 5.

FIG. 6 is a flowchart of the sequential arrangement process shown in FIG. 5. As shown in FIG. 6, the target document yet to be arranged is selected (step S201). If no other target document remains to be arranged ("YES" at step S202), the process is ended.

If the target document retrieved is one which is yet to be arranged ("NO" at step S202), the degree of similarity between each page of the target document and the key page is determined (step S203), and the page of the target document that most closely resembles the key page is selected (step S204). The degree of similarity between the selected page and the key page is converted to a distance value (step S205). The thumbnails of the target document are arranged sequentially in a single row at the calculated distance from and parallel to the row containing the thumbnails of the key document (step S206).

The row containing the thumbnails of the target document is shifted horizontally so that the selected page is positioned next to the key page (step S207).

Figure 7:
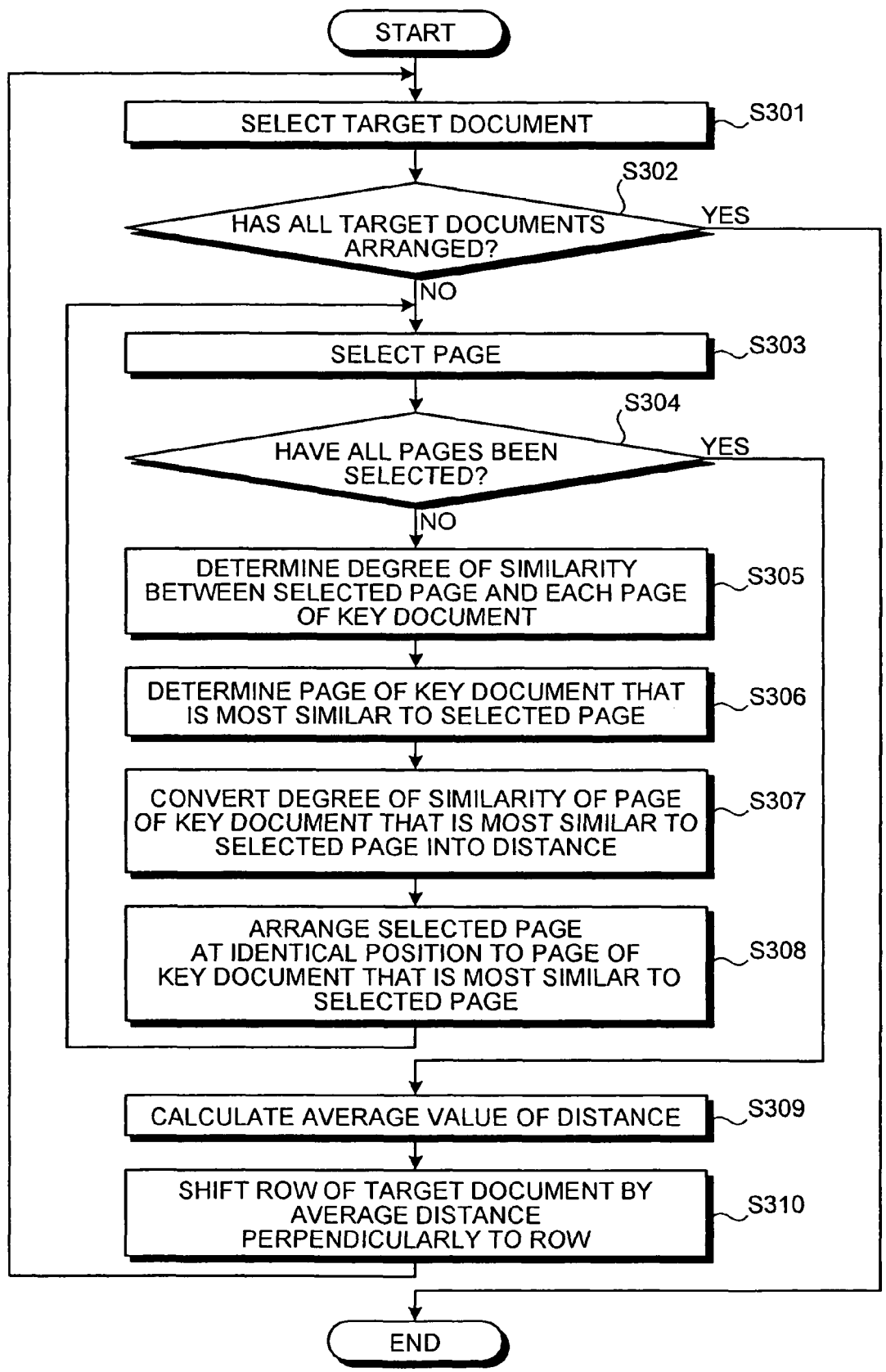
FIG. 7 is a flowchart of a free arrangement process shown in FIG. 5.

FIG. 7 is a flowchart of the free arrangement process shown in FIG. 5. As shown in FIG. 7, the target document yet to be arranged is selected (step S301). If no other target document remains to be arranged ("YES" at step S302), the process is ended.

If the target document retrieved is one which is yet to be arranged ("NO" at step S302), each page of the target document is sequentially selected (step S303), and the following process is carried out.

The degree of similarity between the selected page and each page of the key document is determined (step S305). Next, the page of the key document that is most similar the selected page is determined (step S306). The degree of similarity between the selected page and the page of the key document that is most similar to the selected page is converted to distance (step S307). The thumbnail of the selected page is placed over the thumbnail of the page of the key document which it is most similar to the selected page (step S308).

If the aforementioned process is carried out for all the pages of the target document ("YES" at step S304), the average value of the distances calculated at step S307 is calculated (step S309). The row containing the thumbnails of the target document is shifted by the average distance vertically (step S310). Once the arrangement of the target document is completed, the process is repeated for the next target document.

All the processes of the document comparing apparatus 100 can be realized by having a computer execute a ready program. An example of a computer for executing the document comparison program is explained next with reference to FIG. 8.

Figure 8:
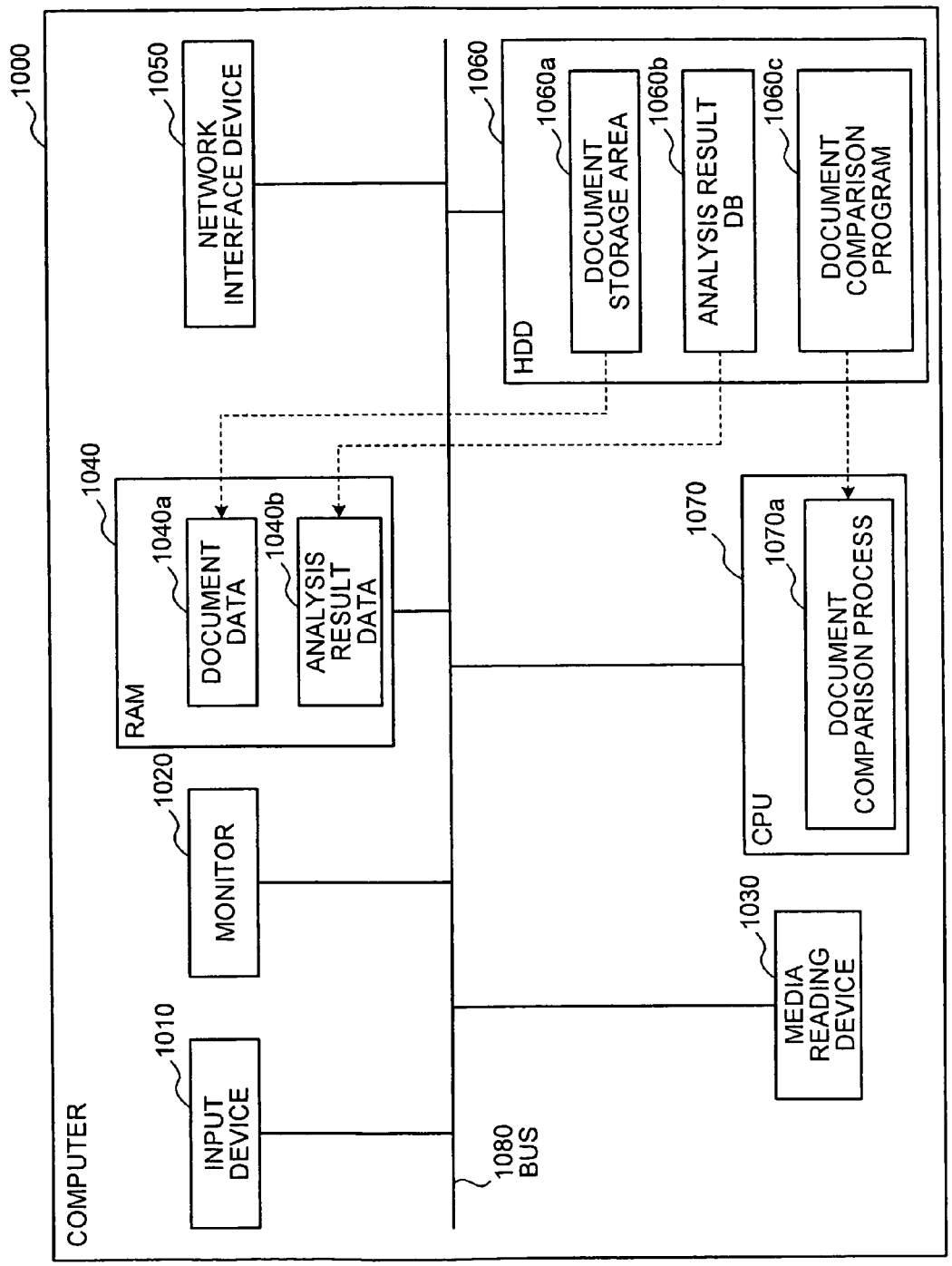
FIG. 8 is a block diagram of a computer that executes a document comparison program.

FIG. 8 is a block diagram of a computer that executes the document comparison program. A computer 1000 includes an input device 1010 that accepts input of data from the user, a monitor 1020, a media reading device 1030, a random access memory (RAM) 1040 that temporarily stores different kinds of data, a network interface device 1050 that aids data exchange with other computers via a network, a hard disk drive (HDD) 1060, and a central processing unit (CPU) 1070. A bus 1080 interconnects all the parts mentioned above.

The HDD 1060 stores a document comparison program 1060c with functions similar to the functions of the document comparing apparatus 100. The HDD 1060 also contains a document storage area 1060a that corresponds to the document storing unit 140 of FIG. 4, and an analysis result DB 1060b that corresponds to the analysis result DB 170 of FIG. 4.

The CPU 1070 reads the document comparison program 1060c from the HDD 1060 to execute it as a document comparison process 1070a. The electronic document comparison process 1070a corresponds to the control unit 130 shown in FIG. 4.

The CPU 1070 reads the necessary data from the document storage area 1060a of the HDD 1060 and stores them as document data 1040a in the RAM 1040. Similarly, the CPU 1070 reads the necessary data from the analysis result DB 1060b and stores them as analysis data 1040b in the RAM 1040. The CPU processes various data based on the document data 1040a and the analysis data 1040b stored in the RAM 1040.

The document comparison program 1060c may also be stored on a recording medium such as the CD-ROM and read by the computer 1000 from the CD-ROM. Alternatively, the document comparison program 1060c may be stored on another computer (or server) connected to the computer 1000 by a public circuit, Internet, local area network (LAN), wide area network (WAN), etc, and read by the computer 1000 from the computer (or server).

Thus, according to the present embodiment, the thumbnails of all the pages of the key document are arranged sequentially in a single row. Similarly, the thumbnails of all the pages of the target document are arranged in a position with respect to the row containing the thumbnails of the key document according to the degree of similarity with the pages of the key document. Consequently, the degree of similarity between the key document and the target documents can be discerned without having to open each document to check its content.

The user can easily select the required document by focusing attention on the target document(s) that closely resembles the key document.

While in the present embodiment, a case of selecting a document of which a part of contents is to be used to create a new document has been explained, the present invention is applicable to other purposes.

According to the embodiments described above, it is possible to check similarity between documents without opening each document one by one.

Moreover, according to the present invention, it is possible to easily compare documents to determine a difference.

Furthermore, according to the embodiments described above, it is possible to easily determine a degree of similarity between documents.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program for comparing documents, the computer program making a computer execute:
   specifying a key document that is used as a base for comparison, and a key page that is used as a base for comparison from among the pages of the key document;
   comparing a plurality of pages included in a document with the key page selected from among the pages of the key document including a plurality of pages page by page, to determine a closest page having a highest similarity to the key page from among the pages of the document and a degree of similarity between the document and the key document;
   arranging the key document by arranging thumbnails of pages of the key document in a row according to a page order;
   arranging the document by arranging thumbnails of pages of the document in a row parallel to the row of the thumbnails of the key document such that a thumbnail of the closest page, among the thumbnails of the pages of the document, is positioned closest to the key page; and
   outputting a result of arrangement of the key document and the document.

2. The computer-readable recording medium according claim 1, wherein the arranging the document includes arranging a plurality of documents such that each of the documents is arranged in a row, and a distance from the row of the key document to the row of the each of the documents is determined based on the degree of similarity to the key document.

3. The computer-readable recording medium according to claim 1, wherein the computer program further makes the computer execute drawing a line between thumbnails that form a combination of pages having a similarity higher than a threshold, the combination formed with one of the thumbnails of the key document and one of the thumbnails of at least one document.

4. The computer-readable recording medium according to claim 1, wherein the computer program further makes the computer execute enclosing a combination of thumbnails having similarity higher than a threshold in a frame of a distinguishing color, the combination formed with one of the thumbnails of the key document and one of the thumbnails of at least one document.

5. The computer-readable recording medium according to claim 1, wherein
   the computer program further makes the computer execute determining a closest combination of thumbnails of pages having highest similarity, the combination formed with one of the thumbnails of the document and one of the thumbnails of the key document;
   the arranging the key document includes arranging the thumbnails in a row; and
   the arranging the document includes arranging the thumbnails of the document in a row parallel to the row of the key document, such that the thumbnails forming the closest combination are adjacent to each other.

6. The computer-readable recording medium according to claim 5, wherein
   the arranging the key document includes arranging the thumbnails in a row,
   the arranging the document includes arranging a plurality of documents such that each of the documents is arranged in a row, and
   a distance from the row of the key document to the row of the each of the documents is determined based on the degree of similarity to the key document.

7. The computer-readable recording medium according to claim 5, wherein the arranging the document includes excluding a thumbnail of one of the pages of the document having similarity lower than a threshold.

8. An computer for comparing documents, comprising:
   a specifying unit configured to specify a key document that is used as a base for comparison, and a key page that is used as a base for comparison from among the pages of the key document;
   a comparing unit configured to compare a plurality of pages included in a document with the key page selected from among the pages of the key document including a plurality of pages page by page, to determine a closest page having a highest similarity to the key page from among the pages of the document and a degree of similarity between the document and the key document;
   a key-document arranging unit configured to arrange the key document by arranging thumbnails of pages of the key document in a row according to a page order;
   a document arranging unit configured to arrange the document by arranging thumbnails of pages of the document in a row parallel to the row of the thumbnails of the key document such that a thumbnail of the closest page, among the thumbnails of the pages of the document, is positioned closest to the key page; and
   an output unit configured to output a result of arrangement of the key document and the document.

9. The computer according to claim 8, wherein
the document arranging unit is configured to arrange a plurality of documents such that each of the documents is arranged in a row, and
a distance from the row of the key document to the row of the each of the documents is determined based on the degree of similarity to the key document.

10. The computer according to claim 8, wherein the document arranging unit is further configured to draw a line between thumbnails that form a combination of pages having a similarity higher than a threshold, the combination formed with one of the thumbnails of the key document and one of the thumbnails of at least one document.

11. The computer according to claim 8, wherein the document arranging unit is further configured to enclose a combination of thumbnails having similarity higher than a threshold in a frame of a distinguishing color, the combination formed with one of the thumbnails of the key document and one of the thumbnails of at least one document.

12. The computer according to claim 8, wherein the document arranging unit is further configured to exclude a thumbnail of one of the pages of the document having similarity lower than a threshold.

13. A method for comparing documents, comprising:
specifying a key document that is used as a base for comparison, and a key page that is used as a base for comparison from among the pages of the key document;
comparing a plurality of pages included in a document with the key page selected from among the pages of the key document including a plurality of pages page by page, to determine a closest page having a highest similarity to the key page from among the pages of the document and a degree of similarity between the document and the key document;
arranging the key document by arranging thumbnails of pages of the key document in a row according to a page order;
arranging the document by arranging thumbnails of pages of the document in a row parallel to the row of the thumbnails of the key document such that a thumbnail of the closest page, among the thumbnails of the pages of the document, is positioned closest to the key page; and
outputting a result of arrangement of the key document and the document to a display unit.

14. The computer-implemented method according to claim 13, wherein the arranging the document includes arranging a plurality of documents such that each of the documents is arranged in a row, and
a distance from the row of the key document to the row of the each of the documents is determined based on the degree of similarity to the key document.

15. The computer-implemented method according to claim 13, further comprising drawing a line between thumbnails that form a combination of pages having a similarity higher than a threshold, the combination formed with one of the thumbnails of the key document and one of the thumbnails of at least one document.

16. The computer-implemented method according to claim 13, further comprising enclosing a combination of thumbnails having similarity higher than a threshold in a frame of a distinguishing color, the combination formed with one of the thumbnails of the key document and one of the thumbnails of at least one document.

17. The computer-implemented method according to claim 13, further comprising determining a closest combination of thumbnails of pages having highest similarity, the combination formed with one of the thumbnails of the document and one of the thumbnails of the key document, wherein
the arranging the key document includes arranging the thumbnails in a row, and
the arranging the document includes arranging the thumbnails of the document in a row parallel to the row of the key document, such that the thumbnails forming the closest combination are adjacent to each other.

\* \* \* \* \*